United States Patent [19]

Barlet

[11] Patent Number: 4,680,440
[45] Date of Patent: Jul. 14, 1987

[54] SHIELDING ARRANGEMENT AND METHOD FOR TIG

[76] Inventor: Loren E. Barlet, 58100 Romeo Plank Rd., Mt. Clemens, Mich. 48044

[21] Appl. No.: 251,797

[22] Filed: Apr. 7, 1981

[51] Int. Cl.[4] .............................................. B23K 9/16
[52] U.S. Cl. .................................. 219/75; 219/137 R
[58] Field of Search ................ 219/74, 75, 137 R, 136

[56] References Cited

U.S. PATENT DOCUMENTS

| | | | |
|---|---|---|---|
| 2,686,860 | 8/1954 | Buck | 219/74 |
| 2,819,383 | 1/1958 | Johnston | 219/118 |
| 2,859,328 | 11/1958 | Sohn | 219/74 |
| 2,859,329 | 11/1958 | Lesnewich | 219/74 |
| 2,903,559 | 9/1959 | Wempe | 219/75 |
| 2,919,341 | 12/1959 | Roth et al. | 219/74 |
| 2,963,570 | 12/1960 | Rieppel | 219/74 |
| 3,053,967 | 9/1962 | Gorman et al. | 219/74 |
| 3,125,666 | 3/1964 | Gorman et al. | 219/74 |
| 3,226,523 | 12/1965 | Filipski et al. | 219/74 |
| 3,473,002 | 10/1969 | Suzuki | 219/137 |
| 3,484,575 | 12/1969 | Cunningham | 219/74 |
| 3,534,388 | 10/1970 | Ito et al. | 219/121 |
| 3,604,889 | 9/1971 | Rohrberg | 219/121 |
| 3,692,973 | 9/1972 | Oku et al. | 219/121 |
| 4,100,390 | 7/1978 | Jackson | 219/74 |
| 4,166,940 | 9/1979 | Barger et al. | 219/74 |

*Primary Examiner*—E. A. Goldberg
*Assistant Examiner*—C. M. Sigda
*Attorney, Agent, or Firm*—John R. Benefiel

[57] ABSTRACT

A gas shielding arrangement and method is disclosed for use with tungsten inert gas (TIG) welding and the like, consisting of an inner, primary flow of an inert gas such as argon, passing about the electrode and weld area, and an outer radially spaced secondary flow of hydrogen gas, completely enveloping the flow of inert gas and ignited by the welding arc to provide a flow of burning hydrogen gas which consumes the atmospheric oxygen penetrating into the flow to minimize oxidizing of the weld metal. The flow of hydrogen gas also minimizes dissipation of the inert gas to conserve and improve its shielding effect. The heat generated by the burning hydrogen heats the portions of the workpiece surrounding the weld to produce superior welds with improved grain structure by minimizing the quenching effect of the weld created by conduction of the weld heat into the surrounding metal.

9 Claims, 3 Drawing Figures

SHIELDING ARRANGEMENT AND METHOD FOR TIG

BACKGROUND OF THE INVENTION

Field of the Invention

This invention concerns welding apparatus and methods and more particularly for the so-called TIG and MIG type welding, i.e., tungsten inert gas and metal inert gas welding. In these methods, an electrode has an electrical potential applied between it and the workpiece to cause an arc to be formed between the electrode and the workpiece. The heat generated by the arc causes melting of the base metal in order to form the weld.

In order to prevent the migration of atmospheric nitrogen and oxygen into the weld and resultant poor weld quality as well as contamination of the electrode itself, an outer shielding flow of an inert gas is employed which greatly reduces the presence of oxygen and nitrogen in the weld area. Argon gas is commonly employed, applied through an annular clearance space surrounding the electrode to provide a more or less complete envelopment of the electrode and weld area for this purpose.

The gases most commonly used are argon and helium, since nitrogen, while being inert, tends to adversely affect the quality of the weld. These gases are relatively costly and in accordance with the rate of flow of these gases required for adequate shielding, the cost of the process correspondingly is affected.

In order to reduce the flow of shielding gas for adequate weld quality, a method is sometimes used in which a flow of a cheaper gas such as carbon dioxide or air located radially outward from the space through which the argon flows. While relatively effective in precluding the dissipation of the argon or helium flow, the higher rates of gas flow used for effective shielding tend to cool the metal to produce an enhanced quenching effect of the weld, adversely affecting the quality of the weld metal grain structure. The weld is adversely affected either by too rapid heating or cooling of the weld metal, this effect causing undesirable changes in the crystal or grain size and residual stresses in the surrounding metal.

In order to be conveniently usable in production, control over the flow of shielding gas should be integrated with the welding controls, such as to be suitable for automation of the equipment and/or rapid manipulation by workers utilizing manual setups.

It has heretofor been recognized that the addition of hydrogen gas mixed into the shielding gas, burns, consuming oxygen to reduce the oxide formation on the weld and improving the shielding effect on the argon.

However, there is a tendency for the presence of the hydrogen gas to create porosity and pin holes in the weld metal, probably due to formation of water vapor upon burning.

There has also been heretofor employed hydrogen gas jetted into the vicinity of the argon flow. Neither approach produces complete shielding of the inert gas primary shielding flow.

The hydrogen gas intermixed in the argon gas did burn, which tended to reduce the oxides but so intermixed did not provide an effective confinement of the argon gas flow, although the volume of the burning hydrogen increased the size of the envelope of shielding gas and thereby to some extent reduced the flow of argon gas required for adequate shielding.

Such separate hydrogen gas jetting that has heretofor been employed has been relatively crude and not integrated into the machine controls such as to provide convenient usage thereof.

Accordingly, it is an object of the present invention to provide a more effective shielding of an arc welding torch of the type employing inert gas as a primary shielding flow surrounding the welding electrode and weld area.

It is still another object of the present invention to provide an improved inert gas shielding arrangement in which reduced inert gas flow is enabled while producing welds of superior quality.

It is still another object of the present invention to provide a hydrogen gas flow at the weld torch without producing porosity in the resultant weld.

It is yet another object of the present invention to provide such hydrogen inert gas shielding arrangement in which the shielding gas flow control is entirely integrated into the welding controls.

It is a still further object of the present invention to provide such hydrogen inert gas shielding for an arc welding torch in which the hydrogen gas provides a completely surrounding envelope about the exterior of the inert gas flow path.

SUMMARY OF THE INVENTION

These and other objects of the present invention are achieved by a method and arrangement for TIG or similar arc welding in which there is provided a flow of primary inert gas such as argon, surrounding the electrode in a conventional fashion, but in which an outer and radially spaced cylindrical flow or ring of burning hydrogen is provided, ignited by the arc to produce a confining curtain of burning hydrogen, spaced apart from the inert gas flow. This spacing minimizes the tendency for water vapor to enter the weld area, resulting in elimination of the pin holing or porosity of the weld. At the same time, the burning hydrogen consumes atmospheric oxygen tending to migrate into the argon gas flow shield, to reduce the tendecy for the formation of oxides in the weld. The burning hydrogen gas "curtain" also establishes a confinement about the inert gas flow, minimizing the dissipation of argon gas outwardly away from the weld area. This in turn reduces the flow quantity required for acceptable weld quality.

The hydrogen flow control is integrated into the welding controls so that hydrogen flow is automatically initiated upon initiation of the argon gas flow, which is established upon activation of the welding controls to establish the welding arc. Thus, upon initiation of the hydrogen gas flow, it is immediately ignited to produce the burning hydrogen ring.

In an alternative embodiment, a greatly reduced flow of hydrogen is maintained during the intervals between weld cycles. It has been discovered that the presence of the flame of burning hydrogen facilitates the striking of the arc.

The heat of the burning hydrogen transferred into the workpiece tends to produce welds having grain structure of a superior quality due to the heating of the metal surrounding the weld, to prevent too-rapid cooling of the weld. That effect yields welds of superior metallurgical properties due to its effect on the metal grain structure.

The reduction in the flow volume of argon or other inert gas required reduces the cost of welding; the hydrogen gas being relatively less expensive than inert gas, and also since relatively lower flow rates of hydrogen gas are required in order to provide the aforementioned advantages.

DETAILED DESCRIPTION OF THE PREFERRED EMBODIMENT

In the following detailed description, certain specific terminology would be employed for the sake of clarity and a particular embodiment described in accordance with 35 USC 112. It is to be understood that the same is not intended to be limiting and indeed should not be so construed inasmuch as the invention is capable of taking many forms and variations within the scope of the appended claims.

The present invention has been found to have particular application to the so-called TIG welding (i.e., tungsten inert gas welding) and will be described in conjunction with such system. However, it may also be advantageously applied to MIG (metal inert gas) and other variations of the arc welding process, as will be understood by those skilled in the art.

Figure 1:
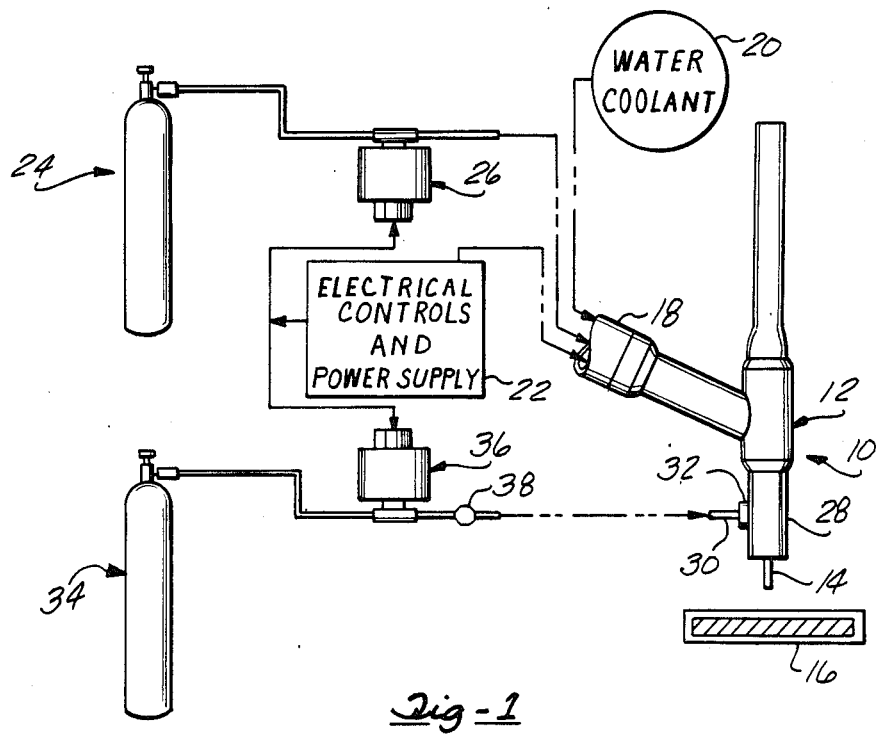
FIG. 1 is a diagrammatic representation of a welding apparatus according to the present invention.

Referring now to FIG. 1, a conventional TIG welding set-up is depicted combined with the hydrogen gas assisted shielding arrangement according to the present invention. A conventional TIG welding apparatus includes a welding torch 10, consisting of a holder 12 in which is clamped a tungsten electrode 14, shown positioned adjacent a workpiece 16. The tungsten electrode 14 and workpiece 16 have impressed thereacross a high frequency voltage for initiating an arc between the workpiece 14 and 16, after which a primary voltage potential is applied to maintain the arc, enabling welding to be carried out. The holder 12 receives a cable 18 through which is applied the necessary electrical connection to the electrode 14, a water cooling passage, and also a flow passage for an inert primary shielding gas, most typically argon. The inert gas emanates from an opening surrounding the electrode 14 such as to shield the weld and electrode in a manner as will be described hereinafter in further detail in connection with a description of FIG. 2.

The cable 18 receives cooling water from source 20.

The electrical potential both high frequency, high voltage starting and lower voltage primary is supplied via a suitable electrical connection from the electrical controls and power supply 22, associated with the welding system.

The argon or other inert gas is supplied via suitable connections with a supply tank 24. Flow control is achieved by providing a solenoid operated valve 26, conventionally controlled by a signal from the electrical control and power supply 22 such that whenever an arc is to be established by switching controls, solenoid valve 26 is opened to allow flow of the primary shielding inert gas to the weld area.

For conventional TIG welding operations, a flow rate of 10 to 20 cubic feet per hour has been found to be sufficient to provide the shielding effect described above.

Upon activation of the welding controls, a high frequency, high voltage potential is applied across the electrode 14 and the workpiece 16, (via a grounding clamp not shown), and an arc is established. Flow of argon gas is simultaneously initiated, surrounding the electrode and thereby the weld area. Upon establishment of the arc, the high frequency voltage is discontinued and a primary DC or low frequency potential applied in order to maintain the arc and allow the welding operations to be conducted.

It will be understood that this above described portion of the system is conventional.

According to the concept of the present invention, an arrangement and method consisting of supplying a burning hydrogen gas assist to the primary shielding effect is provided.

This system includes a skirt 28 received over the lower outside diameter of the holder 12 having internal flow passages receiving a flow of hydrogen gas via tubing 30 and tubing connection 32.

The flow of hydrogen gas is received from a storage tank 34 via and controlled by a solenoid operated valve 36 and a manual flow control valve 38. The solenoid valve 36 is operated also by the electrical controls and power supply 22, advantageously utilizing the same control siqnal as is generated to control the solenoid valve 36 such that flow is initiated from the hydrogen tank 34 to the welding tip torch 10 upon initiation of the welding arc.

Figure 2:
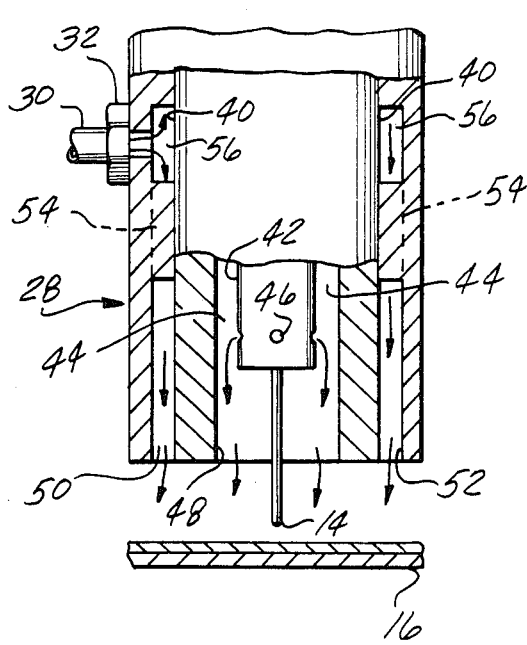
FIG. 2 is an enlarged fragmentary and partially sectional view of the welding torch tip revealing the details thereof.

In FIG. 2, the details of the gas flow paths are revealed. The skirt 28 consists of a cylindrical sleeve sized to be received over a gas cup 40 included in the conventional torch assembly. Gas cup 40 is adapted to threadably mount a collet body 42 which clamps the tungsten electrode 14 thereto. An annular space 44 is adapted to receive the argon gas flow, via a series of openings 46 extending about the collet body 42 with an internal passage shown receiving the argon gas flow which passes into the annular space 44 formed between the inside diameter 48 of the gas cup 40 and the collet body 42 passing outwardly to surround the electrode 14 and envelop the weld area.

The gas cup 40 creates an annular or radial spacing with respect to a second annular flow passage 50 formed by the inside diameter 52 of the lower region of the skirt.

The annular flow passage 52 is in communication with a series of axially extending slots 54 which enter into an undercut annular groove 56. This groove receives hydrogen gas flow via tube 30 and fitting 32 such that hydrogen flow will pass into the annular groove 56 then flow outwardly through the axial slots 54 and thence into the annular flow passage 50, to flow outwardly radially spaced from the argon gas flow.

Upon initiation of the arc, it has been found that the hydrogen gas will be ignited substantially instantaneously to produce a cylindrical curtain or ring of burning hydrogen gas surrounding the weld area and confining the argon gas flow, but at a radially spaced location therefrom.

The volume of hydrogen gas flow should be established to be adequate to completely envelope the argon gas flow but spaced therefrom to eliminate porosity or pitting of the welds due to formation of water vapor. At the same time, the burning hydrogen gas barrier very effectively consumes the atmospheric oxygen and provides a confinement of the argon or other inert gas such that it has been found that a reduced primary shielding flow may be employed while still producing high quality welds.

A further result of the arrangement is that heat from the burning hydrogen is transferred into the metal adjacent to the weld area to reduce the quench effect created by rapid conduction of the weld heat into the surrounding metal.

Figure 3:
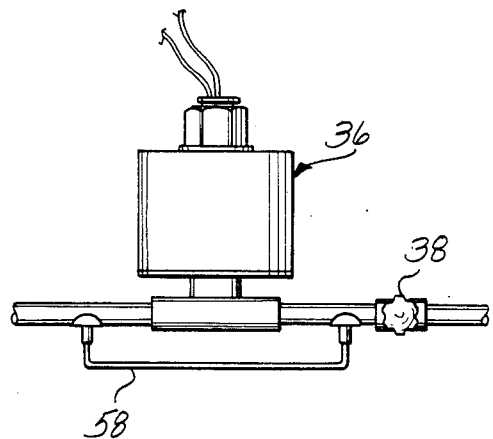
FIG. 3 is an enlarged fragmentary view of an alternate arrangement utilized for establishing the hydrogen gas flow.

In FIG. 3, an alternative arrangement is shown in which a small restricted by-pass passage 58 is provided, by-passing the solenoid valve 36, such that a slight gas flow is maintained whenever the manual valve 38 is opened. It has been discovered that maintenance of a pilot flame at the annular space 50 between welding intervals substantially enhances the ease with which the arc may again be struck. The reason for this effect is not known, and it is noted that a scientific explanation is not here required, but it may be that ionization of the molecules in the region of the electrode is achieved by the hydrogen gas flame, which in turn renders the establishment of the arc easier upon imposition of the high frequency voltage.

The hydrogen gas flow need only be at relatively low pressure, i.e., 5 psi pressure has been found adequate, with adjustment of the flow by the manual valve 38 to be just sufficient to ensure complete enveloping of the argon flow and weld without creating an excessive flame such as to render the handling of the torch by the welder inconvenient. The heating of the metal adjacent the weld has been found to improve substantially the metallurgical characteristics of the metal due to the eliminating of the quenching effect normally occasioned by rapid transfer of the welding heat into the surrounding metal.

The cylindrical or ring flow pattern provides a complete envelopment of the primary shielding gas flow, preventing the escape of argon and the intrusion of atmospheric oxygen and nitrogen.

The burning of the hydrogen consumes the oxygen molecules which do infiltrate into the hydrogen gas flow to almost totally eliminate the tendency for oxide formation at the weld site. This is achieved with a relatively modest consumption of hydrogen gas and relatively low flow rates as distinguished from the prior art approaches in which a relatively high flow of an outer shielding gas has been employed, tending to aggravate the quenching effect at the weld site.

While the process has been found to be very advantageous in conjunction with TIG welding operations, it is to be understood that the concept can be applied to other welding processes.

It can be further appreciated that the burning hydrogen is achieved automatically without the need for manual manipulation by the welder such as to be very convenient in use not hindering the welding operations to any significant degree.

Having thus described the invention, what is claimed is:

1. In an arc welding apparatus of the type including a welding electrode mounted within an electrode holder, a gas cup surrounding said electrode and carried by said holder, and means for supplying inert gas flow in a surrounding relationship to said electrode during welding operations to thereby achieve a shielding of said electrode, means for applying an electrical potential to said electrode to establish a welding arc and controls for initiating and terminating application of said electrical potential, said welding controls including means for initiatiang inert gas flow upon initiation of said welding arc, the improvement comprising:

means for establishing a surrounding flow of hydrogen gas upon initiation of said welding arc, including an annular space creating a flow of said hydrogen in a cylindrical pattern radially outwardly spaced from and parallel to said inert gas flow and in surrounding relationship thereto, said means further including means responsive to activation of said welding controls to initiate said hydrogen gas flow whereby said hydrogen gas is ignited by intiation of said welding arc and forms completely surrounding curtain of burning hydrogen gas during said welding operations.

2. The arc welding apparatus according to claim 1 wherein said electrode is tungsten.

3. The welding apparatus according to claim 1 further including bypass means for sustaining a hydrogen gas flow at a reduced flow rate to maintain a flame of burning hydrogen between arc welding cycles, whereby to promote the ease with which an arc may be struck with said electrode.

4. The welding apparatus according to claim 1 wherein said means for establishing hydrogen gas flow consists of a surrounding skirt member mounted over said gas cup and including an annular space formed by an inside diameter of said skirt and an outside diameter of said gas cup and means for directing gas flow into said annular space whereby to create flow of gas thereout in surrounding relationship to said electrode and inert gas flow.

5. A method of shielding an arc welding electrode during periods of welding operation comprising the steps of:

establishing an inert gas flow surrounding the arc welding electrode during welding;

establishing a completely enclosing flow of hydrogen gas during said welding operation surrounding said inert gas flow, said hydrogen gas flow in a cylindrical pattern radially spaced and parallel to said inert gas flow, whereby ignition of said hydrogen gas creates an outer ring of completely surrounding burning hydrogen gas about said inert gas flow, thereby reducing infiltration of atmospheric oxygen into the weld area and confining said insert gas thereby improving the weld quality and also reducing the necessary volume of flow of argon to shield the weld and electrode, and to cause heating of the metal adjacent said weld.

6. The method according to claim 5 wherein the step of establishing said inert gas flow includes the step of directing a flow of argon gas about said electrode.

7. The method according to claim 6 wherein said hydrogen gas flow is established at a pressure on the order of 5 psi.

8. The method according to claim 5 including the step of maintaining a reduced hydrogen flow between said periods of welding operations to thereby obtain a reduced flow of burning hydrogen to facilitate initiation of said welding arc.

9. The method according to claim 5 wherein said hydrogen flow is established by passing hydrogen under pressure into an annular space radially outwardly spaced from said electrode and from said inert gas flow path.

* * * * *

UNITED STATES PATENT AND TRADEMARK OFFICE
CERTIFICATE OF CORRECTION

PATENT NO.   : 4,680,440
DATED        : July 14, 1987
INVENTOR(S)  : Loren E. Barlet It is certified that error appears in the above-identified patent and that said Letters Patent is hereby corrected as shown below:

```
Column 1, line 52, "heretofor" should be --heretofore--.

Column 1, line 60, "heretofor" should be --heretofore--.

Column 2, line 3, "heretofor" should be --heretofore--.

Column 2, line 43, "tendecy" should be --tendency--.

Column 4, line 30, "siqnal" should be --signal--.

Column 6, line 3, "initiatiang" should be --initiating--.

Column 6, line 8, "hydrogen" should be --hydrogen gas--.

Column 6, line 13, "intiation" should be --initiation--.

Column 6, line 14, "forms" should be --forms a--.
```

Signed and Sealed this

First Day of December, 1987

*Attest:*

DONALD J. QUIGG

*Attesting Officer*  *Commissioner of Patents and Trademarks*